United States Patent [19]
Chatterjee et al.

[11] Patent Number: 6,036,927
[45] Date of Patent: *Mar. 14, 2000

[54] MICRO-CERAMIC CHEMICAL PLANT HAVING CATALYTIC REACTION CHAMBER

[75] Inventors: Dilip K. Chatterjee; Syamal K. Ghosh, both of Rochester; Edward P. Furlani, Lancaster, all of N.Y.

[73] Assignee: Eastman Kodak Company, Rochester, N.Y.

[ * ] Notice: This patent is subject to a terminal disclaimer.

[21] Appl. No.: 08/898,097

[22] Filed: Jul. 22, 1997

[51] Int. Cl.[7] .................................................... B01J 8/02
[52] U.S. Cl. ..................... 422/211; 422/195; 422/188; 422/232; 422/239; 422/236; 422/129; 422/193
[58] Field of Search ..................................... 422/129, 188, 422/201, 218, 222, 236, 238, 191–198 U, 130, 200, 211, 232, 239; 428/166; 210/649

[56] References Cited

U.S. PATENT DOCUMENTS

| | | | |
|---|---|---|---|
| 4,597,873 | 7/1986 | Almaula | 210/649 |
| 5,015,444 | 5/1991 | Koga et al. | 422/191 |
| 5,209,906 | 5/1993 | Watkins et al. | 422/200 |
| 5,534,328 | 7/1996 | Ashmead et al. | 428/166 |
| 5,843,385 | 12/1998 | Dugan | 422/191 |

*Primary Examiner*—Marian C. Knode
*Assistant Examiner*—Frederick Varcoe
*Attorney, Agent, or Firm*—Raymond L. Owens

[57] ABSTRACT

An integrated micro-ceramic chemical plant having a unitary ceramic body formed from multiple ceramic layers in the green state which are sintered together includes a reaction chamber and a first passage for providing communication with the reaction chamber so that two or more fluids may be delivered to such reaction chamber for reaction, and the unitary ceramic body defining a catalytic bed in the reaction chamber, such catalytic bed being formed of microporous ceramic impregnated with at least one catalyst for promoting the reaction in the reaction chamber to produce reaction products; and the unitary ceramic body defining a filtration channel connected to the reaction chamber including filters disposed in such filtration channel for separating the reaction products so as to retrieve desired reaction products.

12 Claims, 6 Drawing Sheets

MICRO-CERAMIC CHEMICAL PLANT HAVING CATALYTIC REACTION CHAMBER

CROSS REFERENCE TO RELATED APPLICATION

Reference is made to commonly assigned U.S. patent application Ser. No. 08/835,979, filed Apr. 11, 1997, entitled "Integrated Ceramic Micro-Chemical Plant" by Ghosh et al; and U.S. patent application Ser. No. 08/879,345, filed Jun. 20, 1997, now U.S. Pat. No. 5,961,932, entitled "Reaction Chamber for an Integrated Micro-Ceramic Chemical Plant" by Ghosh et al, the teachings of which are incorporated herein.

FIELD OF THE INVENTION

The present invention relates to integrated micro-ceramic chemical plants in which catalytic reaction and filtering chambers used in producing and separating such chemicals and products of chemical reactions.

BACKGROUND OF THE INVENTION

Micro-engineering is a rapidly growing field which is liable to impact on many applications over the coming years. Three-dimensional micro-engineered devices and systems involving silicon planar technology can be produced with features from one to a few hundred microns having tolerances in micron or as small as submicron level. Most of the current micro-engineering technologies are evolved from the adaptation of thin films, photolithographic and etching technologies generally applied to silicon wafers on which silicon monoxide, silicon dioxide, silicon nitride and the like thin films are deposited and etched thereafter yielding planar configurations.

Advances have been made to study chemical processes based on microfluidic systems technology using planar structures on silicon chips. Predictive flow modeling has also been developed to realize the benefits from the microfluidic technology.

The performance of chemical processing is strictly governed by the mass transport and sometimes thermal transport properties of the system. It is therefore essential to understand how miniaturization affect the chemical processes. Laminar flow of an ideal fluid in a tube or channel is well characterized. Pfahler et al have demonstrated in an experiment using channels of various geometry on silicon wafers that there is an agreement between experiment and theory concluding that the conventional Hagen-Poiseuille equation is obeyed down to a scale of few microns. Laminar volume flow per unit time, $Q_f$, of an ideal fluid in a circular pipe is described by the Hagen-Poiseuille equation:

$$Q_f = \frac{\pi}{8\mu_f} \cdot \frac{dp}{dx} r^4$$

where $\mu_f$ and r are the fluid viscosity and tube radius respectively, dp/dx is the pressure gradient along the x-direction of flow.

As the channel widths are reduced, the fluid flow becomes more laminar which provides control over the distribution of material and that dictates that fluid mixing is achieved by diffusion or other molecular migration processes rather than by turbulence. This problem of mixing can be solved by commercially available software packages on computational fluid dynamics. A measure of degree of mixing, F, can be estimated from the expression $F=Dt/l^2$, where D is a reactant diffusion constant, t is contact time allowed for mixing and l is distance across a reactant stream. Quantitatively, mixing may be defined as substantial to nearly complete for F values from 0.1 to 1. Typically, near complete mixing of two fluids in 1 second corresponds to channel widths of 100 $\mu$m.

Similarly, problems exist with respect to heat transfer in micro-channels under laminar flow conditions. Understanding of this laminar heat flow process can be useful in designing and building micro heat exchangers and chemical micro-reactors.

The current planar silicon technologies are inadequate for the fabrication of an integrated and self-contained micro-ceramic chemical plant having embedded structures and unitary construction.

SUMMARY OF THE INVENTION

It is an object of the present invention to provide an integrated micro-ceramic chemical plant which can be used to have catalytic reactions and also to separate desired reaction products from undesired reaction products.

This object is achieved in an integrated micro-ceramic chemical plant having a unitary ceramic body formed from multiple ceramic layers in the green state which are sintered together comprising:

(a) the unitary ceramic body defining a reaction chamber and first passage means for providing communication with the catalytic reaction chamber so that two or more fluids may be delivered to such reaction chamber for reaction, and the unitary ceramic body defining a catalytic bed in the reaction chamber which is formed of micro-porous ceramic impregnated with at least one catalyst for promoting the reaction in the reaction chamber to produce reaction products; and (b) the unitary ceramic body defining a filtering chamber connected to the reaction chamber including filtering means disposed in such filtering chamber for separating the reaction products so as to retrieve desired reaction products.

It is a feature of the present invention that integrated micro-ceramic chemical plants can be fabricated using micromolded ceramic technology with the incorporation micro-filtering porous ceramic materials in which the mixing, chemical reactions, preferably catalytic reactions of chemicals and separation of fluid chemicals from solid products can be done in a highly effective manner. The catalytic reaction chamber and micro-filtering system in accordance with the present invention has one or more permeable walls with an option of controlled heating of the chamber walls that permit the mixing and reaction of two or more input fluid chemicals. The permeable wall is manufactured of ceramic and its permeability can be controlled by selecting the ceramic material and the porosity during the fabrication of the wall.

In micromolded ceramic technology features as small as one hundred micron meters ($\mu$m) or less up to a micron meter sizes can be molded with a die onto the surfaces of softer 'green' ceramic and ceramic composite bodies and sintered to have harder and denser bodies with those micro-features embedded on them. The manufacturing advantages of this technology include: plurality of micro-features can be incorporated in the 'green' ceramic in one manufacturing step; layer by layers with micro-features can be built up and from this a unitary body can be built up in a single sintering step. Another important feature in micromolded ceramic technology is that since the 'green' ceramic bodies shrink during sintering operations, the features replicated in the 'green' bodies also reduce in sizes at the final step of the manufacturing processes.

It is important that the fluid chemical flow and its reaction with various other species of chemicals can be controlled precisely in planar micro space. The catalyst assisted reactions and the reaction products in integrated ceramic-chemical plants in accordance with the present invention can be efficiently managed, separated and classified if the reaction area can be minimized.

The improved catalytic reaction chamber and micro-filtering system in the integrated micro-ceramic chemical plant has a number of advantages:

a) by reducing the dimensions of the systems it is possible to ensure good mixing in a short time without the need to introduce turbulence. For those chemicals which require turbulent mixing can also be incorporated in the integrated micro-ceramic chemical plant and, if desired, turbulence is caused from external stimulus such as vibration;

b) indirect chemical reaction by osmosis process is made possible by providing semi- or permeable wall to effectively control the chemical reactions;

c) more efficient thermal control is possible because of large surface to volume ratio. Since relatively small quantities of chemicals are used in the micro-channels at any given time, the risk of chemical explosion or occurrence of highly exothermic reaction is also reduced. It is also possible to shut down the chemical reaction very quickly;

d) ceramic and ceramic composite materials, in general, are chemically inert and, therefore, are resistant to corrosion;

e) cleaning of the catalytic reaction chamber, catalytic beds, micro-filters, passage tubes, inlet and outlet holes, etc. is much more efficient because they can be cleaned using acidic or caustic solutions as desired;

f) most ceramic and ceramic composite materials are more thermally stable than silicon; and g) ceramic and ceramic composite materials possess high strength, high hardness, and in some instances high fracture toughness, rendering them durable and wear resistant.

BRIEF DESCRIPTION OF THE DRAWINGS

FIG. 3b is a partial cross-sectional view taken along the lines of 3B—3B of FIG. 3a;

DETAILED DESCRIPTION OF THE PREFERRED EMBODIMENT

The rate of a chemical reaction can be increased by raising the temperature. However, this is not always feasible or practical. Some reactants and products decompose at high temperatures. From an economic standpoint, raising the temperature means increased energy costs. Fortunately, there are certain substances called catalysts that offer an alternative approach to speeding up a reaction. A catalyst increasing the rate of reaction without being consumed by it. A catalyst operates by lowering activation energy for a chemical reaction.

A heterogeneous catalyst is one that is in a different phase from the reaction mixture. Most commonly, the catalyst will be a solid that increases the rate of a gas phase or fluid phase reaction.

A homogeneous catalyst is one that is present in the same phase as the reactants. It speeds up the reaction by forming a reactive intermediate that decomposes to give products. In this way, the catalyst provides an alternative path of lower activation energy for the reaction.

A properly designed catalyst should have the essential attributes of activity, stability, selectivity, and regenerability. These can be related to the physical and chemical properties of the catalyst, which in turn can be related to the variable parameters inherent in the method used for the preparation of the catalyst. In addition to a wide range of techniques for preparation of supported catalysts a substantial number of supports are available for such systems.

The principal catalyst preparation technique involves two stages. First, laying a metal salt component into a finely divided form on a support, generally micro-porous ceramics and secondly, conversion of the supported metal salt to a metallic or oxide state.

The first stage is known as dispersion and is achieved by impregnation, adsorption from solution, co-precipitation, or deposition. While the second stage is called calcination or reduction.

The primary aim of applying a catalytically active component to a support is to obtain the catalyst in a highly dispersed form and hence, in a highly active form when expressed as a function of the weight of the active component.

All the techniques of catalyst preparation reduce to two simple steps: dispersing the active material in a fluid or gaseous form and immobilizing this dispersed material as it is reconverted to an insoluble solid form.

Figure 1:
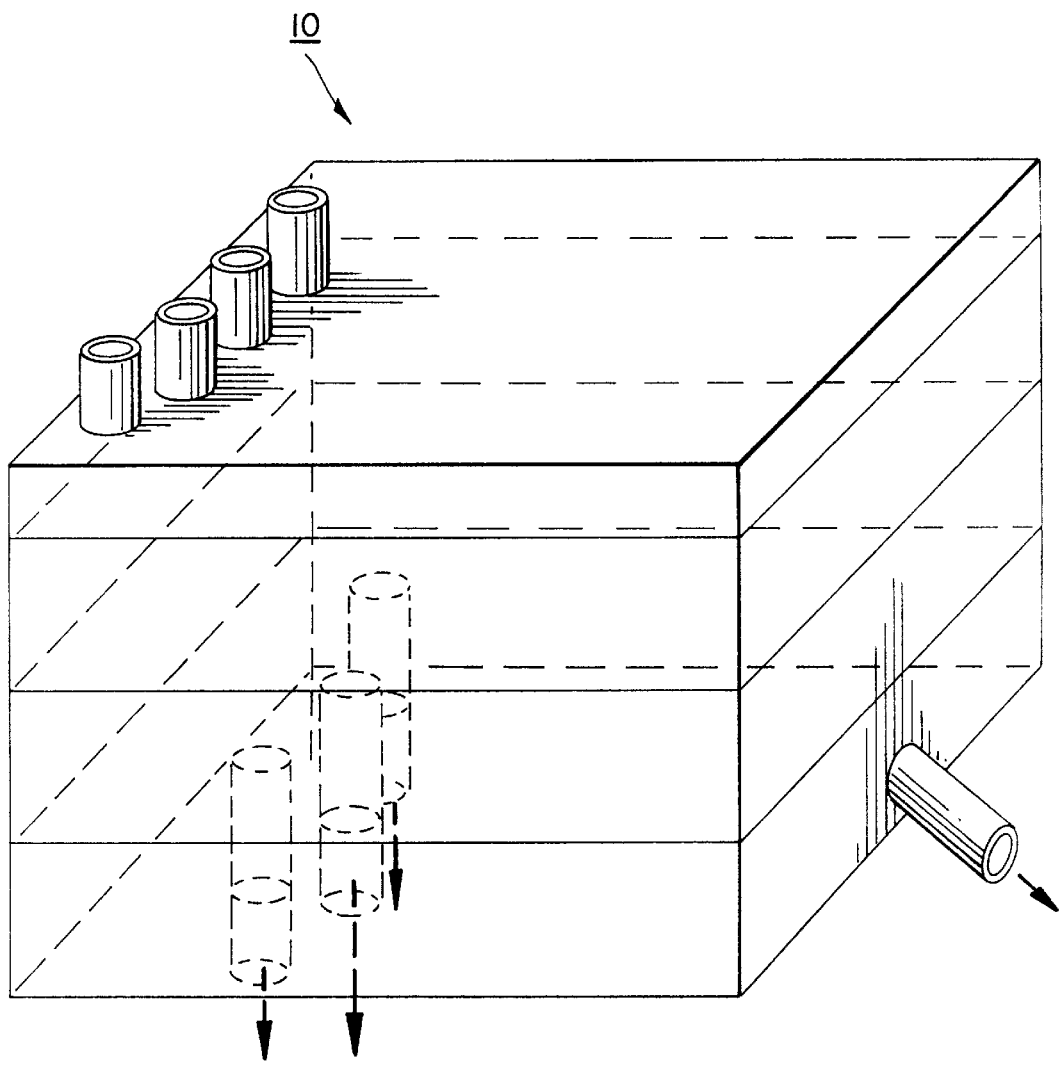
FIG. 1 is a perspective of an integrated micro-ceramic chemical plant in accordance with the present invention.
Figure 2:
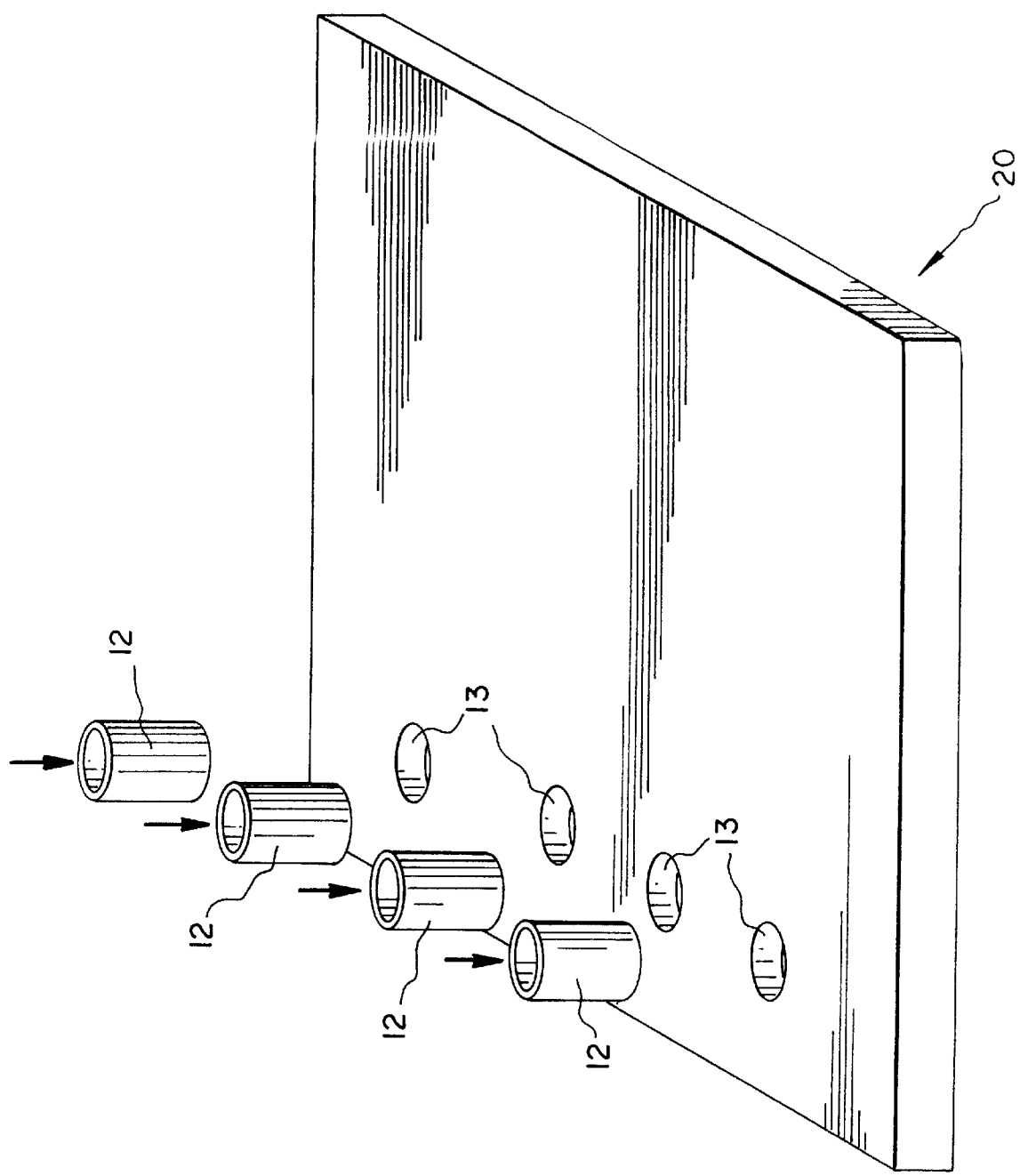
FIG. 2 is a perspective of the first layer of the integrated micro-ceramic chemical plant including the top portion.

Referring to FIG. 1 a perspective is illustrated of an integrated micromolded unitary ceramic block 10 including four different layers which are part of a micro-ceramic chemical plant. FIG. 2 shows the top layer 20 of the unitary ceramic block 10 which contains a row of chemical delivery inlet conduits 12 (which may be tubes) on one side. It is to be noted that the top layer 20 may include more than two conduits in a row. The conduits 12 lead directly to a second layer 30 through hole 13.

Figure 3A:
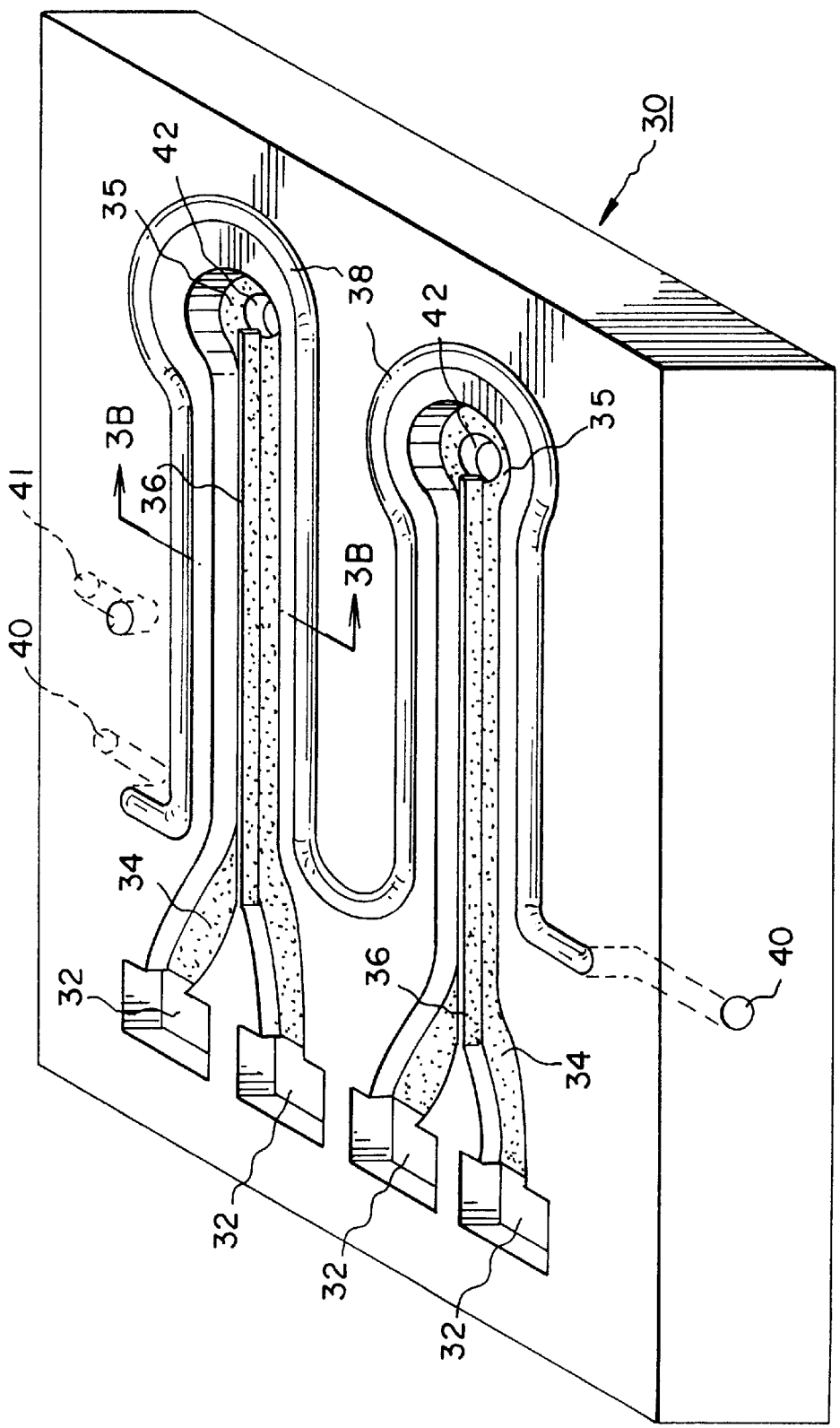
FIG. 3a is a perspective of the second layer from the top of the integrated micro-ceramic chemical plant showing the catalytic reaction chamber and permeable wall within such catalytic reaction chamber.
Figure 3B:
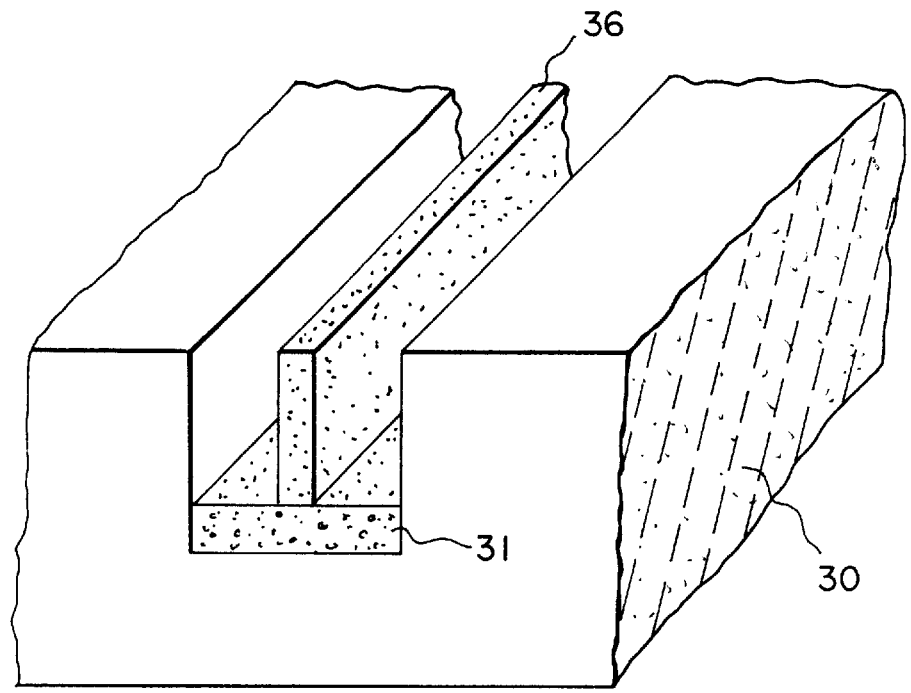

FIG. 3a shows the second layer 30 which includes a catalytic reaction chamber 34 in the form of two micro-channels. More than two micro-channels can of course be used in accordance with the present invention. The second layer 30 has receiving chambers with holding tanks 32 and is formed with discharge holes 42 disposed in an exiting chamber 35. It should be noted that catalytic reaction chamber 34 further includes a permeable (semi-permeable) partition wall 36 which is made of a porous and/or permeable ceramic material which permits the mixing of two different chemicals so that they can properly react as will be described later. As best shown in FIG. 3b, the second layer 30 also contains a catalytic reaction bed 31 to facilitate catalytic reactions. The catalytic reaction bed 31 which is made from micro porous ceramics impregnated with catalysts. This impregnation can be accomplished during manufacture of the bed 31 or during the final sintering step. The second layer 30 contains heating elements 38 surrounding the catalytic reaction chamber 34 and a thermocouple (not shown) inserted in thermocouple feedthrough 41 which monitors and applies a signal to a control system (not shown) for monitoring and controlling the temperature in the catalytic reaction chamber 34.

The permeable partition wall 36 is preferably made by dry pressing ceramic and its composite powders such as zirconia silicate, alumina silicate, zirconia, alumina, silicon carbide, silicon nitride and ceramic composites comprising zirconia-alumina at a pressure such that upon sintering the desired degree of porosity is maintained. It is very important that the pores need to of interconnecting variety. The permeable partition wall 36 can also be made alternatively by gel casting, tape casting and injection molding zirconia silicate or alumina silicate such that upon controlled sintering for each part or item different degrees of porosity are achieved. The permeable partition wall 36 permits controlled reaction between the chemicals in the fluids on either side of the permeable partition wall 36 to permit the mixing of such fluids during a reaction process. The ceramic powder is blended with polymeric fibers such as polyvinyl alcohol, polyethylene glycol or acrylic which upon sintering leaves behind interconnected micropores. The pore size or the diameter of the sacrificial organic fibers vary in a range from 0.1 to 10 $\mu$m because the degree of porosity (density) is warranted by the amount of permeability required for a given chemical process. In other words, custom tailored permeability can be incorporated by controlling the compacting pressure, diameter of the polymer fibers and sintering temperature for a given ceramic composition. The preferred way of making the green permeable partition wall 36 containing sacrificial organic fibers such as polyvinyl alcohol, is to gel cast the ceramic mixture containing the organic binders and organic fibers in a mold and air drying the part to drive off the solvent. Upon compacting and subsequent firing the sacrificial organic fibers will produce a wall having a variable degree of porosity. The permeable partition wall 36, which is in the green state, is then incorporated in the unitary ceramic green body before all the layers are assembled and sintered to form the sintered unitary micro-ceramic chemical plant. It is instructive to note that a plurality of channels can be provided to handle more than two chemicals or alternatively the catalytic reaction chamber 34 can be made longer by configuring serpentine, complex, wavy, winding and angular meandering forms to allow for longer reaction time. An embedded ceramic heating element 38 is provided in walls defining the perimeter of the catalytic reaction chamber 34 to provide heat to the catalytic reaction chamber 34. The embedded heating element 38 can be made from ceramics such as $MoSi_2$, $TiB_2$, $ZrB_2$, $WO_3$ or high-temperature resistive metals or metallic alloys. The electrical leads 40 for the embedded heating element 38 are located at the side of the ceramic second layer 30 defining the perimeter of the catalytic reaction chamber 34, and is an integral part thereof. The thermocouple feedthrough 41 located close to the heating element and the thermocouple (not shown) can be inserted in the thermocouple feedthrough 41 for both monitor and control of temperature of the reaction chamber. This layer also contain catalytic reaction beds to facilitate catalytic reactions. The catalytic reaction beds are micro-porous ceramics embedded with catalysts.

In chemical reactions involving two or more fluid chemicals and more particularly, those require the help of catalysts, the reduction in channel widths for chemical flow and the reaction areas, particularly catalytic reaction beds are important. In such cases, the fluid flow becomes near laminar which provides control over the distribution of material and that dictates that fluid mixing by diffusion or other molecular migration processes rather than by turbulence. This also ensures proper and complete catalytic reaction, if desired.

The reaction chamber 34 leads to discharge holes 42 contained in the discharge chamber 35 which merges into the next layer 100. The cross-section of the reaction chamber 34 is configured as a rectangle but can be of other shapes such as oval, circular, triangular or any other convenient cross-section. The discharge holes 42 are directly connected to receiving chambers 60 in the next layer 100.

Figure 4:
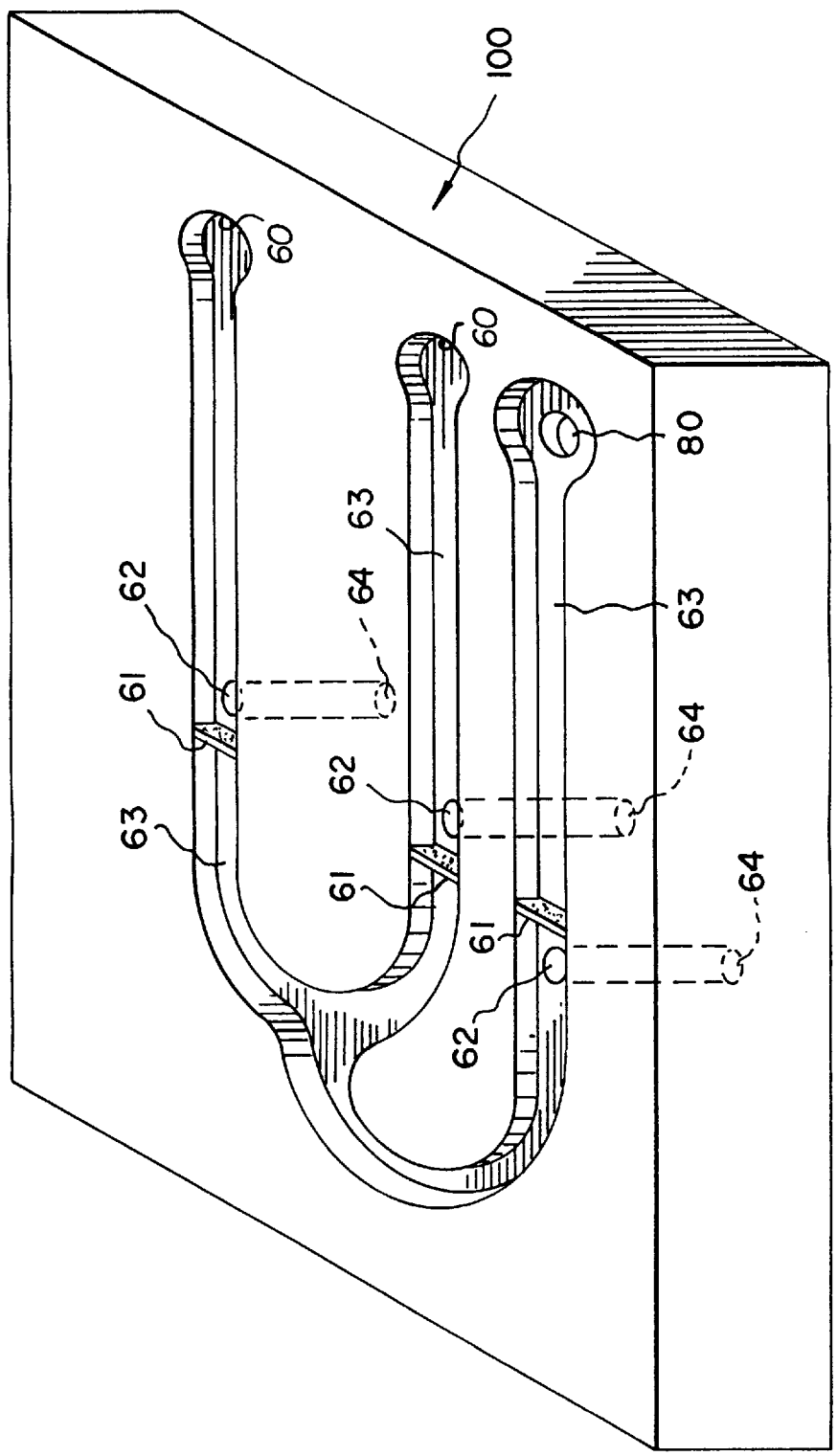
FIG. 4 is a perspective of the third layer from the top of the integrated micro-ceramic chemical plant showing a filtering chamber.

FIG. 4 shows that the third layer 100 includes receiving chambers 60 disposed directly below the exit chambers 35 in the second layer 30, filter 61 for separating the solid reaction products from the fluid chemicals, discharge holes 62 for discharge of the solid products of the chemical reactions, and an exit hole 80 for draining out of the reacted chemicals. The filters 61 separates the solid reaction products from the fluid reactants and permits the retrieval of desired solid reaction products. The plurality of the filters 61 in the reaction chamber of FIG. 4 have different pore sizes for filtering various sized solid reaction products and their size classification. The discharge-holes 42, located in the second layer 30, feed the chemical to a receiving chamber 60 from where it is distributed to a filtration channel 63. The filtration channel 63 include outlet through discharge 62 for retrieving the desired reaction products (filtered solids) from the integrated micro-ceramic chemical plant. Also provided are through discharge holes 62 which are connected to outlet holes 64 for evacuating undesired solid reaction products. Optional valves (not shown) can open or close the discharge holes 62 on demand.

Figure 5:
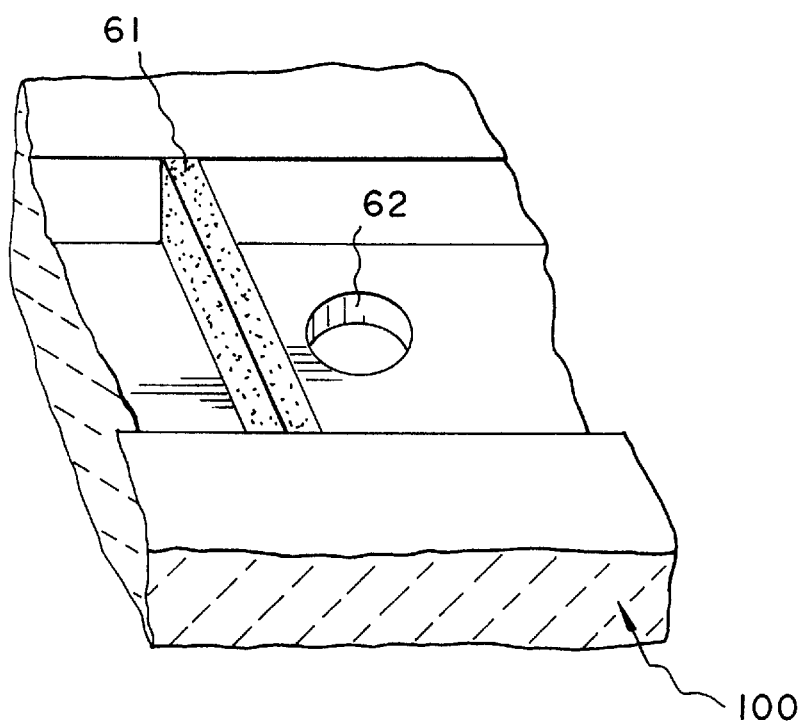
FIG. 5 is a partial perspective of a portion of the filtering chamber shown in FIG. 4.

FIG. 5 shows a partial perspective of the filter 61 solid discharge hole 62. Although the invention is described with respect to solid and fluid reaction products, it will be understood that the desired reaction products may be fluid.

Figure 6:
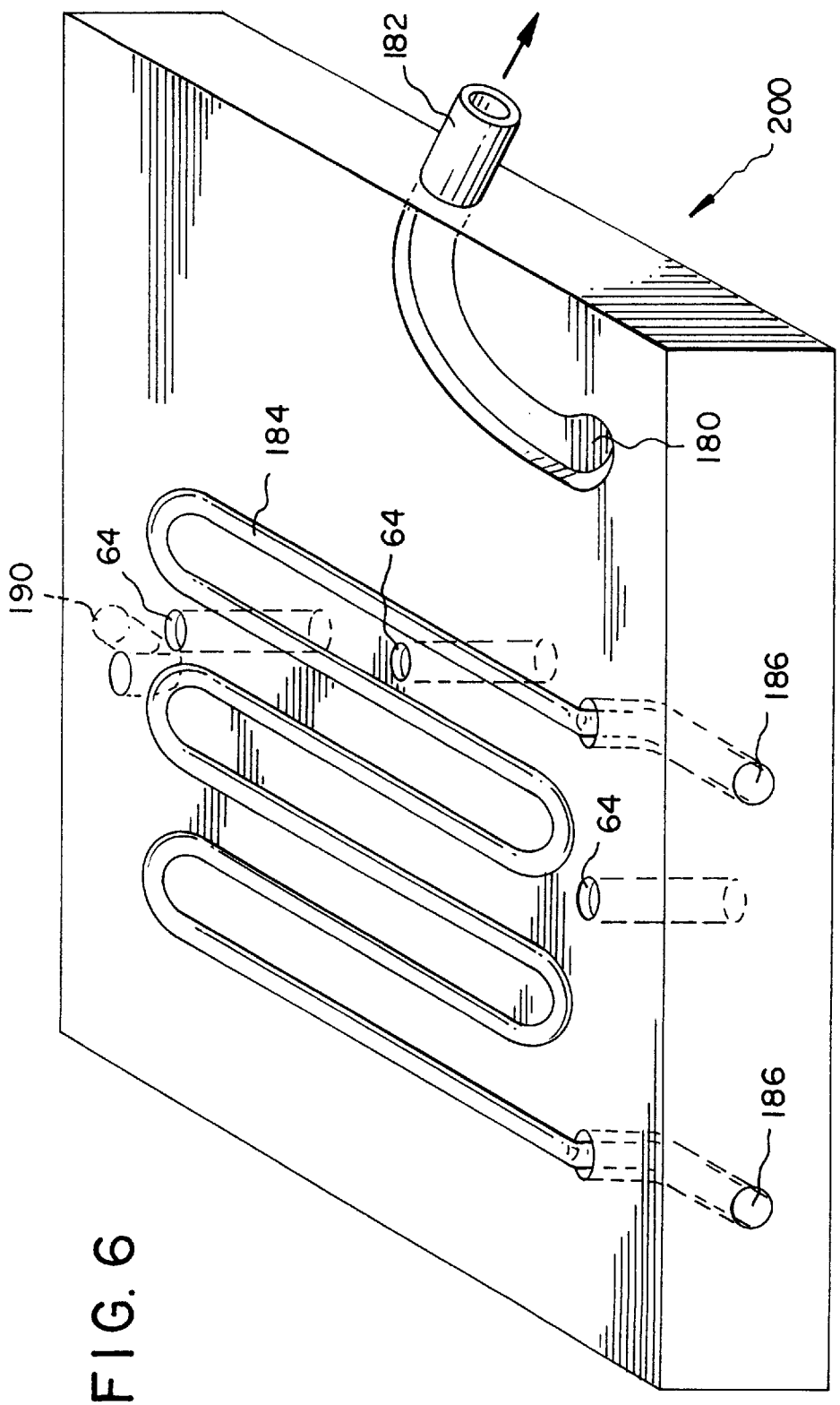
FIG. 6 is a perspective of the fourth layer of the integrated micro-ceramic chemical plant showing chambers for retrieving the reaction products and also an arrangement for heating the integrated micro-ceramic chemical plant.

FIG. 6 shows the bottom ceramic layer 200 which includes a receiving chamber 180 disposed directly below the exit hole 80 in the third layer, and a conduit 182 for dispensing the chemicals. Another receiving chamber 180 can receive either fluid reaction products. The solid reaction products can be exited from the filtering channels 63 by conduits 64. The bottom ceramic layer 200 is also provided with embedded heating coils 184 to promote reactions in the filtering channels 63. The embedded heating coils 184 can be made from ceramic materials such as $MoSi_2$, $TiB_2$ or $ZrB_2$, $WO_3$ or high temperature metallic alloys such as Nichrome (Ni—Cr alloys used commercially as heating elements), and Mo. The electrical leads 186 for the heating elements 184 are located at the side of the ceramic plate and is an integral part of it. In order to monitor and control the temperature, a feed-through inlet hole 190 which extends up to the wall of the chamber is provided which protrudes at an angle from outside to the surface of the bottom ceramic layer 200. A thermocouple can be introduced through the inlet hole 190 to measure as well as control the temperature. This thermocouple (not shown) is connected through a feed back control system to the heater power supply.

The present invention involves an integrated micro-ceramic chemical plant. When the term "micro" is used it refers to the fact that the features within the chemical plant have dimensions of about 100 micrometers or less. The unitary ceramic block 10 is formed by multiple ceramic layers in the 'green' state which are sintered together. These layers can typically have dimensions 10 to 100 mm wide, 10 to 100 mm long, and 0 mm thick.

The use of the term "green" means that when particulate ceramic powder, preferably mixed with an organic binder is subjected to uniform compacting forces in order to provide an unsintered preform which has uniform density. One particular effective material is a tetragonal zirconia ceramic powder that can be micromolded to form the layers by standard methods such as injection molding, gel casting, tape casting, dry pressing or cold isostatic pressing. Other ceramic materials which can be used are $Al_2O_3$, AlN, BN, MgO, $Al_2O_3$—$ZrO_2$ composite, SiC, $Si_3N_4$ and other oxide and non-oxide ceramics and their composites thereof.

The features within each layer such as chambers, channels and passageways can be formed as follows:

(a) features like feed-through, through-holes, mixing chambers and catalytic reaction chambers can be formed in each layer in the 'green' state by incorporating those features in the mold and replicating those features in the 'green' body. Approximately, 20% to 50% larger sized features must be made to account for shrinkage during sintering. The amount of shrinkage largely depends on the relative amount of organic binders in the ceramic mixture. Typically, 2% to 5% by weight organic binders are added to the fine ceramic or ceramic composite powders for compaction processes such as cold isostatic pressing and dry pressing. On the other hand, 10% to 40% by weight organic binders are used for compaction processes such as gel casting, tape casting and injection molding. The details of compacting procedures and replicating of micro features are known in the prior art.

(b) features like embedded coils and heating coils can be formed by placing sacrificial members comprising organic polymers which are burned away during the sintering process. The details of forming embedded microfeatures are described in the commonly assigned U.S. patent application Ser. No. 08/775,523, filed Jan. 2, 1997, entitled "Miniature Molded Ceramic Devices Having Embedded Spiral Coils" by Chatterjee et al, and commonly assigned U.S. patent application Ser. No. 08/775,524, filed Jan. 2, 1997, entitled "Method for Forming Molded Ceramic Devices Having Embedded Spiral Coils" by Chatterjee et al which are incorporated herein by reference.

(c) features like microchannels can be formed by embedding organic sacrificial member which burn away during sintering or can be incorporated in the molding tools for pressure assisted replication on the 'green' ceramic bodies.

During the sintering process which is the final stage of the manufacturing process of the micro-ceramic chemical plant the 'green' ceramic layers shrink due to the burning of the binders and also due to the consolidation of the ceramic and its composite powders. Provision must be made to compensate for this shrinkage by appropriately enlarging the features in the tools, such as dies and molds, used for replicating such features in the "green" parts.

The invention has been described in detail with particular reference to certain preferred embodiments thereof, but it will be understood that variations and modifications can be effected within the spirit and scope of the invention.

What is claimed is:

1. An integrated micro-ceramic chemical plant having a unitary ceramic body formed from multiple ceramic layers in the green state which are sintered together comprising:

(a) the unitary ceramic body defining a reaction chamber and first passage means for providing communication with the reaction chamber so that two or more fluids may be delivered to such reaction chamber for reaction, and the unitary ceramic body defining a catalytic bed in the reaction chamber, such catalytic bed being formed of micro-porous ceramic impregnated with at least one catalyst for promoting the reaction in the reaction chamber to produce reaction products; and (b) the unitary ceramic body defining a filtration channel connected to the reaction chamber including filtering means disposed in such filtration channel for separating the reaction products so as to retrieve desired reaction products.

2. An integrated micro-ceramic chemical plant having a unitary ceramic body formed from multiple ceramic layers in the green state which are sintered together comprising:

(a) the unitary ceramic body defining a reaction chamber and first passage means for providing communication with the reaction chamber so that two or more fluids may be delivered to such reaction chamber for reaction, a permeable partition wall being provided within the reaction chamber to permit the mixing of fluids during a reaction process, and the unitary ceramic body defining a catalytic bed in the reaction chamber, such catalytic bed being formed of micro-porous ceramic impregnated with at least one catalyst for promoting the reaction in the reaction chamber to produce reaction products; and (b) the unitary ceramic body defining a filtration channel connected to the reaction chamber including filtering means disposed in such filtration channel for separating the reaction products so as to retrieve desired reaction products.

3. The integrated micro-ceramic chemical plant of claim 2 wherein:

(c) further reaction occurs in the filtration channel; and (d) the unitary ceramic body defining conduit means connected to the filtration channel for directing the desired reaction products produced in such filtration channel to exit from the unitary ceramic body.

4. The integrated micro-ceramic chemical plant of claim 2 wherein the first and second passage means are selected to have a circular, oval, triangular, or rectangular cross-section.

5. The integrated micro-ceramic chemical plant of claim 2 wherein the permeable partition wall is a ceramic made by dry pressing zirconia silicate or alumina silicate at a varying pressure such that upon sintering a desired degree of porosity is achieved.

6. The integrated micro-ceramic chemical plant of claim 2 wherein the permeable partition wall is a ceramic made by gel casting, tape casting and injection molding zirconia silicate or alumina silicate such that upon controlled sintering a desired degree of porosity is achieved.

7. The integrated micro-ceramic chemical plant of claim 2 wherein the permeable partition wall is a silicate manufactured under pressure which pressure is selected such that upon sintering at a selected temperature a desired degree of porosity is achieved.

8. The integrated micro-ceramic chemical plant of claim 2 wherein the permeable partition wall is a ceramic comprising zirconia, alumina, silicon carbide, silicon nitride and ceramic composites comprising zirconia-alumina.

9. The integrated micro-ceramic chemical plant of claim 2 wherein the permeable partition wall is made from a mixture comprising sacrificial organic fibers which upon compacting and subsequent firing provide a desired degree of porosity.

10. The integrated micro-ceramic chemical plant of claim 9 wherein the diameter of the sacrificial organic fibers vary from 0.1 to 10 µm.

11. The integrated micro-ceramic chemical plant of claim 2 further including an embedded ceramic heating element disposed in operative relationship to the reaction chamber.

12. The integrated micro-ceramic chemical plant of claim 11 wherein the heating element is a coil formed of $MoSi_2$, $TiB_2$, $ZrB_2$, high temperature resistive metals or metallic alloys.

* * * * *